(12) United States Patent
Sugita et al.

(10) Patent No.: US 6,620,540 B2
(45) Date of Patent: Sep. 16, 2003

(54) FUEL CELL STACK

(75) Inventors: Narutoshi Sugita, Wako (JP); Yoshinori Wariishi, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 174 days.

(21) Appl. No.: 09/927,968

(22) Filed: Aug. 10, 2001

(65) Prior Publication Data
US 2002/0045087 A1 Apr. 18, 2002

(30) Foreign Application Priority Data
Aug. 11, 2000 (JP) .......................... 2000-245436

(51) Int. Cl.⁷ .................. H01M 2/02; H01M 8/04; H01M 8/10
(52) U.S. Cl. ................ 429/34; 429/38; 429/12; 429/32; 429/33
(58) Field of Search .................. 429/34, 38, 12, 429/32, 33

(56) References Cited

U.S. PATENT DOCUMENTS 6,329,093 B1 * 12/2001 Ohara et al. .................. 429/32

* cited by examiner

*Primary Examiner*—Patrick Ryan
*Assistant Examiner*—Angela Martin
(74) *Attorney, Agent, or Firm*—Lahive & Cockfield, LLP (57) ABSTRACT

The fuel cell stack has a horizontal laminate of a plurality of fuel cell units and separators, each fuel cell unit being constituted by an electrolytic membrane sandwiched by an anode and a cathode, and fixing members disposed horizontally on both sides of the laminate, the laminate and the fixing members having a plurality of holes penetrating therethrough in a lamination direction, each hole receiving an insulator-coated rod for fastening the laminate in a lamination direction, an insulator surface of the insulator-coated rod being substantially in contact with an inner surface of each hole of the laminate.

8 Claims, 10 Drawing Sheets

FUEL CELL STACK

RELATED APPLICATIONS

This application claims priority to Japanese Patent Application No. JP2000-245436, filed on Aug. 11, 2000, in Japan. The contents of the aforementioned application are hereby incorporated by reference.

FIELD OF THE INVENTION

The present invention relates to a fuel cell stack comprising a plurality of fuel cell units horizontally laminated alternately with separators and firmly fastened by a plurality of insulator-coated rods penetrating holes of the fuel cell units.

BACKGROUND OF THE INVENTION

For instance, a solid polymer electrolyte-type fuel cell battery usually comprises a fuel cell stack constituted by laminating a plurality of fuel cell units with separators, each fuel cell stack comprising an electrolytic membrane composed of an ion exchange polymer membrane (cation exchange membrane) and an anode and a cathode disposed on both sides of the electrolytic membrane, the fuel cell stack being fastened by a plurality of bolts. In this type of a fuel cell battery, a fuel gas (hydrogen-containing gas) supplied to the anode is turned to hydrogen ions on a catalytic electrode, and migrates through the properly wet electrolytic membrane to the cathode, with electrons released by ionization withdrawn to an external circuit for use as DC electric energy. An oxidizing gas (oxygen-containing gas or air) is supplied to the cathode, at which hydrogen ions react with electrons and oxygen to form water.

Such fuel cell stack is properly mounted onto a vehicle, etc. at a position under a floor thereof, and in this case, the fuel cell stack is desirably as small as possible in height dimension. For this purpose, the fuel cell stack should be mounted horizontally onto the vehicle, with each fuel cell unit and each separator being laminated horizontally.

Figure 14:
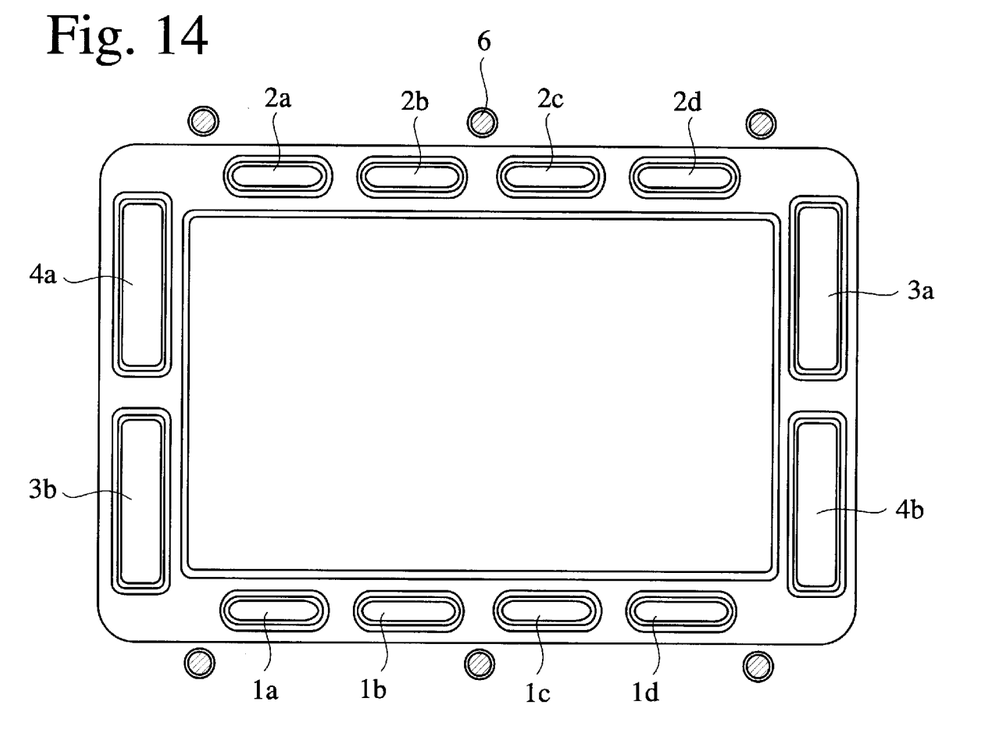
FIG. 14 is a plan view showing a conventional separator assembled in the fuel cell stack.
Figure 15:
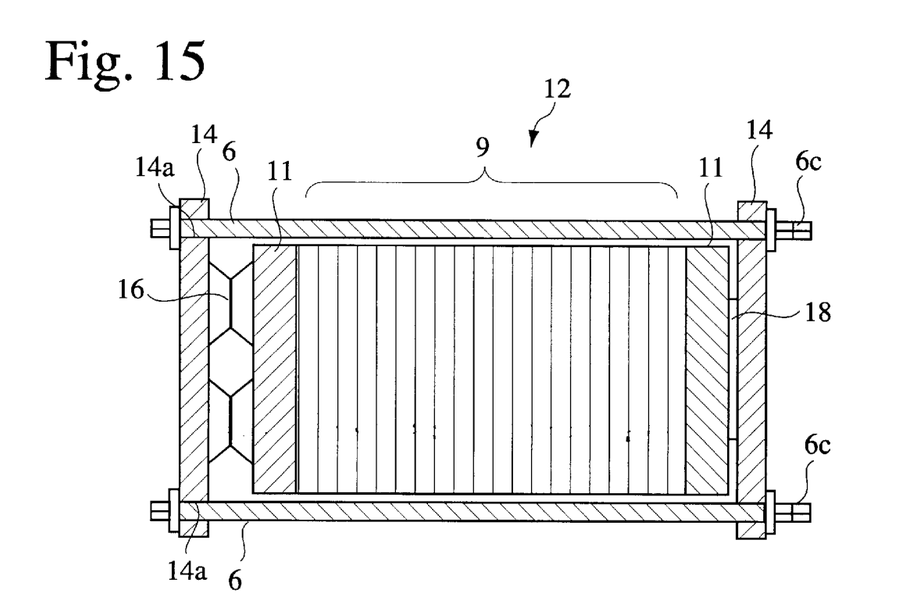
FIG. 15 is a plan view showing a fuel cell stack in which the separators of FIG. 14 are assembled.

To fasten the laminated fuel cell units and separators, as shown in FIGS. 14 and 15, fixing members 11, 11 such as end plates, etc. are conventionally disposed on both sides of the fuel cell stack, and backup plates 14, 14 disposed outside the fixing members 11, 11 have a plurality of holes 14a, 14a for receiving fastening rods 6 having threaded end portions, to which nuts 6c, 6c are screwed. In this case, to ensure electric insulation, each of the fuel cell units and the separators does not have a hole, through which a rod 6 penetrates. With this structure, each of the fuel cell units and the separators is fastened only by sliding friction resistance. Incidentally, 16 denotes a Belleville spring, and 18 denotes a flat washer.

However, the fixing method of a fuel cell stack as shown in FIGS. 14 and 15 is disadvantageous, in the case of horizontally mounting the fuel cell stack, in that vibration, shock, etc. for a long period of time cause the overall fuel cell stack to bend downward, generating gaps between the fuel cell units and separators in their lower portions, though there is no problem in the case of vertically mounting the fuel cell stack. This reason is considered that because a plurality of horizontally extending rods are always subjected to a large load, rods at lower positions tend to expand or bend.

Figure 16:
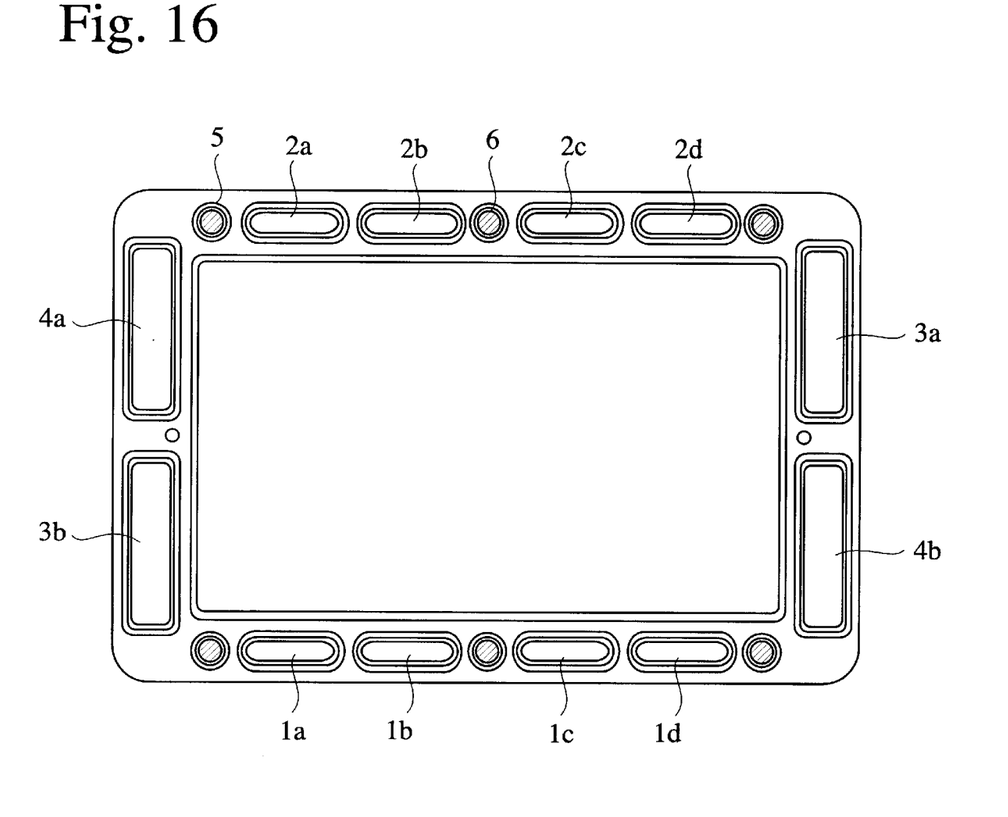
FIG. 16 is a plan view showing another separator assembled in the conventional fuel cell stack.
Figure 17:
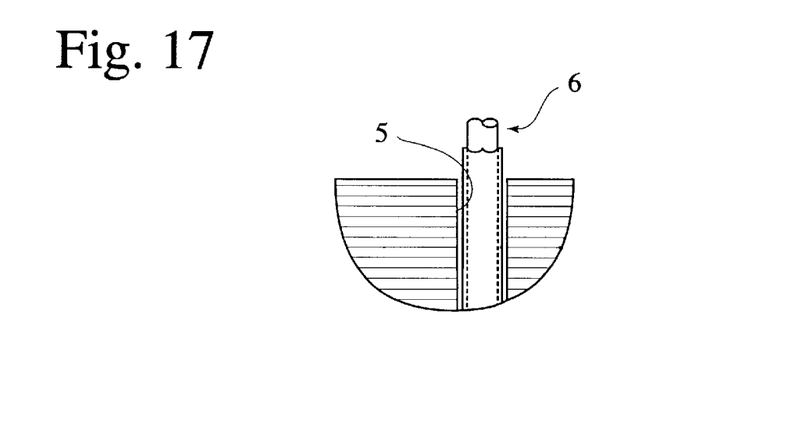
FIG. 17 is a partially enlarged cross-sectional view showing an insulator-coated rod inserted into a hole of the separator of FIG. 16.

Japanese Patent Laid-Open No. 2000-123857 discloses a solid polymer electrolyte-type fuel cell battery comprising a fuel cell laminate and fixing plates disposed on both ends of the fuel cell laminate for fastening the fuel cell laminate with a plurality of tie rods, each tie rod having an electric insulating layer, a hole of the laminate for receiving each tie rod having a larger inner diameter than an outer diameter of the tie rod to ensure electric insulation between the laminate and the tie rod. The relations of the tie rods 6 to each separator in this fuel cell are shown in FIGS. 16 and 17.

However, the fixing method disclosed in Japanese Patent Laid-Open No. 2000-123857 is disadvantageous in that because there is a gap between each tie rod and an inner surface of each hole, sliding and opening may take place between the fuel cell units and the separators by vibration, shock, etc. for a long period of time, resulting in their lower portions opening.

OBJECT OF THE INVENTION

Accordingly, an object of the present invention is to provide a fuel cell stack constituted by horizontally laminated fuel cell units and separators, which do not slide or open even under vibration, shock, etc. for a long period of time.

DISCLOSURE OF THE INVENTION

The first fuel cell stack of the present invention comprises a horizontal laminate of a plurality of fuel cell units and separators, each fuel cell unit being constituted by an electrolytic membrane sandwiched by an anode and a cathode, and fixing members disposed horizontally on both sides of the laminate, the laminate and the fixing members having a plurality of holes penetrating therethrough in a lamination direction, each hole receiving a rod for fastening the laminate in a lamination direction, at least one of an inner surface of the hole and an outer surface of the rod being provided with an insulator, and the surface of the rod being at least partially in contact with the inner surface of each hole of the laminate via the insulator.

With this structure, each of fuel cell units and separators are firmly fixed together not only by sliding friction resistance but also by a plurality of rods. Accordingly, even if the fuel cell stack were subjected to vibration, shock, etc. for a long period of time, the fuel cell stack would not be bent downward, to such an extent that there arise open gaps between the fuel cell units and the separators in a lower portion of the laminate.

In the first fuel cell stack, it is preferable that the rod is coated with an insulator, an insulator surface of the insulator-coated rod being substantially in contact with an inner surface of each hole of the laminate. More preferably, the insulator surfaces of all insulator-coated rods are substantially in contact with the inner surfaces of the holes of the laminate. With this structure, the fuel cell units and the separators are more firmly fixed by the insulator-coated rods with sufficient insulation.

The second fuel cell stack of the present invention comprises a horizontal laminate of a plurality of fuel cell units and separators, each fuel cell unit being constituted by an electrolytic membrane sandwiched by an anode and a cathode, and fixing members disposed horizontally on both sides of the laminate, the laminate being fastened in a lamination direction by rods disposed outside the laminate and fixed to the fixing members, at least one of an outer surface of the laminate and an outer surface of the rod being provided with an insulator, and the surface of the rod being at least partially in contact with the outer surface of the laminate via the insulator.

With this structure, there is no need to provide the laminate with holes, resulting in decrease in the overall cost of the fuel cell stack. Also, because the surfaces of the rods are at least partially in contact with the surfaces of the laminate, the laminate can be prevented from being bent.

In the second fuel cell stack, it is preferable that the rod is coated with an insulator, an insulator surface of the insulator-coated rod being substantially in contact with the outer surface of the laminate. It is also preferable that the laminate comprises a plurality of horizontal grooves on the surface, and that the insulator-coated rods are substantially in contact with inner surfaces of the horizontal grooves. With the horizontal grooves, the laminate can be in firm contact with the insulator-coated rods.

The third fuel cell stack of the present invention comprises a horizontal laminate of a plurality of fuel cell units and separators, each fuel cell unit being constituted by an electrolytic membrane sandwiched by an anode and a cathode, and fixing members disposed horizontally on both sides of the laminate, a plurality of holes for passing a reaction gas penetrating through the laminate and the fixing members in a lamination direction, each hole receiving a rod for fastening the laminate in a lamination direction, at least one of an inner surface of the hole and an outer surface of the rod being provided with an insulator, and the surface of the rod being at least partially in contact with the inner surface of each hole of the laminate via the insulator. The rod is preferably coated with an insulator, an insulator surface of the insulator-coated rod being substantially in contact with an inner surface of each penetrating hole.

PREFERRED EMBODIMENTS OF THE INVENTION

The basic structure of the fuel cell stack of the present invention may be the same as disclosed in Japanese Patent Application No. 11-249830 previously filed in Japan but not yet laid open to the public. Accordingly, the basic structure will be explained briefly here.

Figure 12:
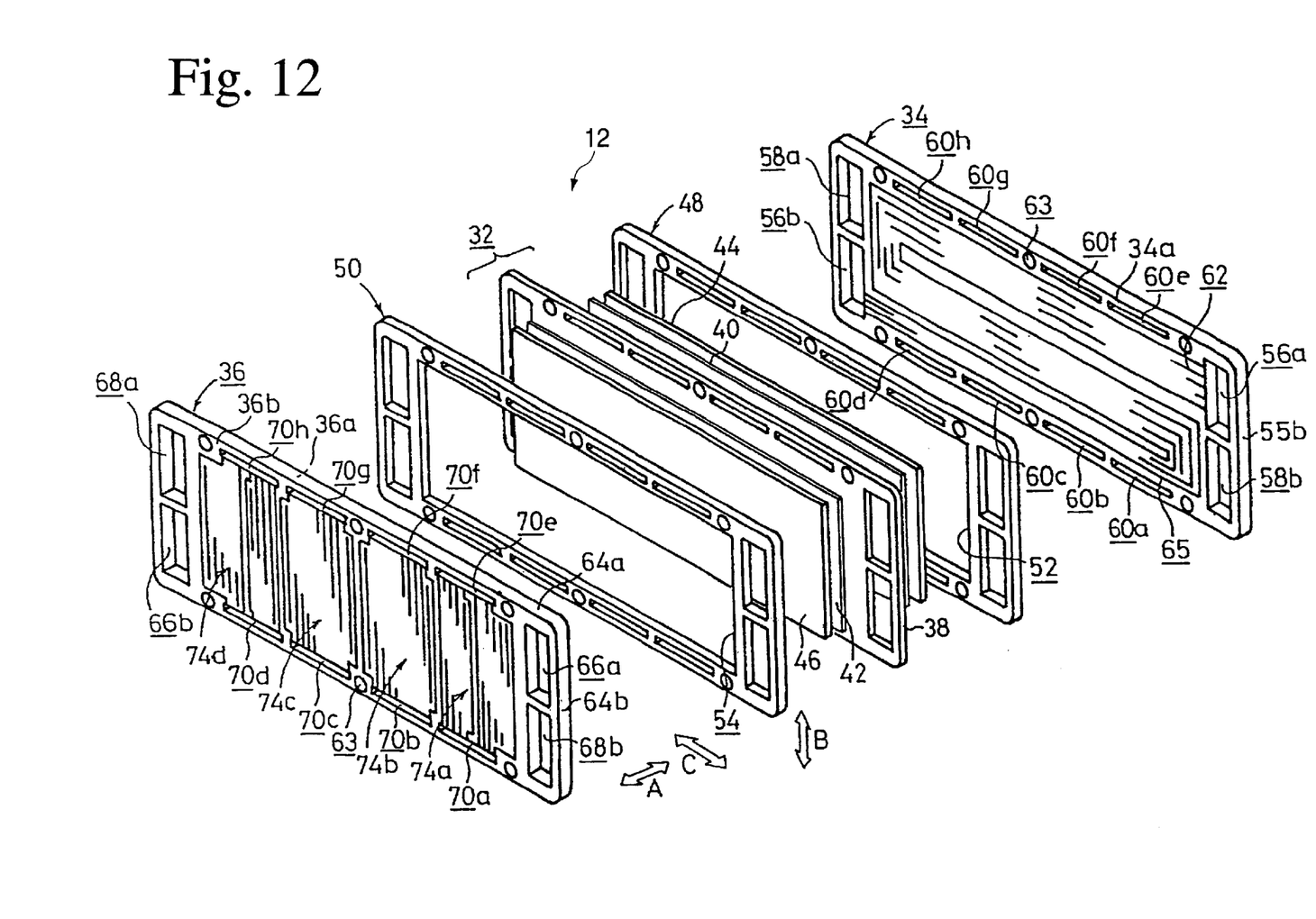
FIG. 12 is an exploded perspective view showing a set of a fuel cell unit and separators constituting the fuel cell stack of the present invention.

As shown in FIG. 12, a fuel cell comprises a fuel cell unit 32 and a pair of separators 34, 36 for sandwiching the fuel cell unit 32, and a plurality of fuel cells each comprising a fuel cell unit 32 and a plurality of separators 34, 36 are laminated in a horizontal direction (direction indicated by the arrow A) to constitute a fuel cell stack 12. The fuel cell stack 12 is in an overall shape of rectangular parallelepiped with short sides in a gravity direction (direction indicated by the arrow B) and long sides in a horizontal direction (direction indicated by the arrow C).

The fuel cell unit 32 comprises an electrolytic membrane 38 such as Nafion (trademark of DuPont), and a cathode 40 and an anode 42 sandwiching the electrolytic membrane 38, each of the cathode 40 and the anode 42 being provided with a gas diffusion layer 44, 46 constituted by, for instance, a porous carbon paper, etc.

The fuel cell unit 32 is provided with gaskets 48, 50 on both sides, the gasket 48 having a large opening 52 for receiving the cathode 40 and a gas diffusion layer 44, and the gasket 50 having a large opening 54 for receiving the anode 42 and a gas diffusion layer 46. The fuel cell unit 32 and the gaskets 48, 50 are sandwiched by separators 34, 36.

The separator 34 is provided with an oxidizing gas inlet 56a for passing the oxidizing gas (oxygen-containing gas or air) and a fuel gas inlet 58a for passing the fuel gas such as a hydrogen-containing gas, etc., an oxidizing gas outlet 56b, and a fuel gas outlet 58b in edge portions 55b on both side ends. The separator 34 is provided with cooling medium inlets 60a–60d in an edge portion on a lower side, and cooling medium outlets 60e–60h in an edge portion on an upper side. Further, a surface 34a of the separator 34 is provided with an oxidizing gas-passing groove 62 communicating with the oxidizing gas inlet 56a such that the groove 62 is horizontally meandering. The oxidizing gas-passing groove 62 merges with the oxidizing gas-passing groove 65, which communicates with the oxidizing gas outlet 56b. The separator 34 has holes 63 into which rods are inserted.

The separator 36 has an oxidizing gas inlet 66a and a fuel gas inlet 68a in upper halves of edge portions on both short sides 64b, and an oxidizing gas outlet 66b and a fuel gas outlet 68b in lower halves of edge portions on both short sides 64b. The separator 36 has cooling medium inlets 70a–70d in an edge portion on a lower side, and cooling medium outlets 70e–70h in an edge portion on an upper side. As shown in FIG. 12, the separator 36 is provided with fuel gas-passing grooves (on the side of 36a) communicating with the fuel gas inlets 68a in the same shape as the oxidizing gas-passing grooves. The fuel gas-passing grooves are horizontally meandering, with communication with the fuel gas outlets 68b. On the side of 36b, the separator 36 is provided with cooling medium-passing grooves 74a–74d. The separator 36 comprises holes 63 for receiving rods.

Figure 13:
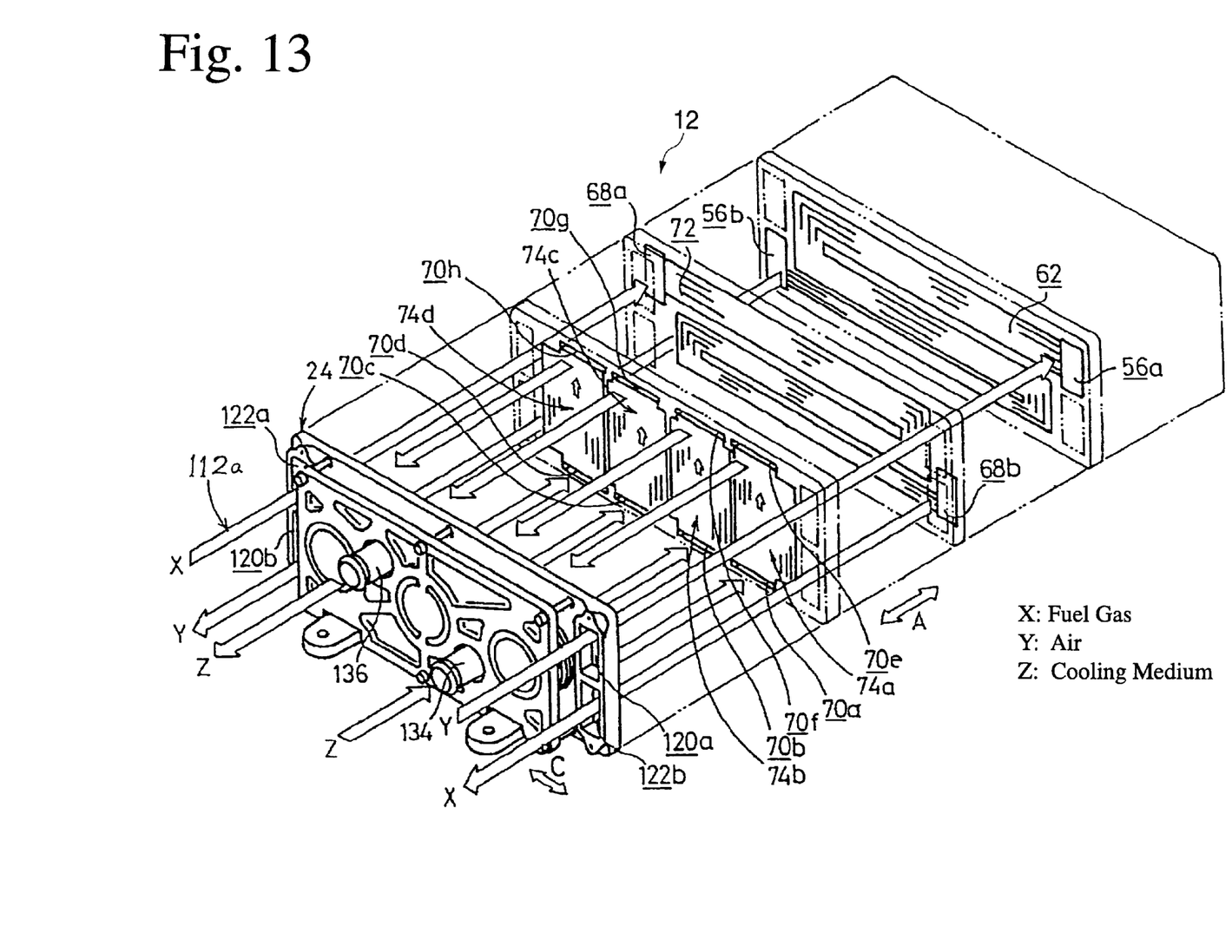
FIG. 13 is a partially exploded perspective view showing the fuel cell stack of the present invention.

As shown in FIG. 13, the end plate 24 comprises an oxidizing gas inlet 120a and a fuel gas inlet 112a in upper halves of edge portions on both short sides, and an oxidizing gas outlet 120b and a fuel gas outlet 122b in lower halves of edge portions on both short sides. The end plate 24 also horizontally comprises cooling medium-passing grooves communicating with the cooling medium inlets 70a–70d of the separator 36, and cooling medium-passing grooves communicating with the cooling medium outlets 70e–70h of the separator 36. The cooling medium inlets and the cooling medium outlets are connected to a supply pipe 134 and a discharge pipe 136, respectively, and the supply pipe 134 and the discharge pipe 136 are projecting outward from the fuel cell stack 12. The end plate 24 has holes for receiving rods.

As shown in FIG. 13, a fuel gas introduced into the fuel gas-passing groove 72 via the fuel gas inlet 112a of the end plate 24 and the fuel gas inlet 68a of each separator 36. The fuel gas supplied to the fuel gas-passing groove 72 flows in the direction of gravity while horizontally meandering along the surface 36a of the separator 36. In this course, a hydrogen-containing gas in the fuel gas is supplied to the anode 42 of the fuel cell unit 32 through the gas diffusion layer 46, while an unused fuel gas is supplied to the anode 42 along the fuel gas-passing groove 72. The unused fuel gas is discharged from the fuel gas outlet 68b through the fuel gas-passing groove 73.

The air is supplied to the oxidizing gas inlet 120a of the end plate 24, and further supplied to the oxidizing gas inlet 56a of the separator 34 assembled in the fuel cell stack 12. In the separator 34, the air entering into the oxidizing gas inlet 56a is introduced into the oxidizing gas-passing groove 62 in the surface 34a, and flows in the direction of gravity while horizontally meandering along the oxidizing gas-passing groove 62. Oxygen in the air is supplied to the cathode 40 from the gas diffusion layer 44, while the unused air is discharged from the oxidizing gas outlet 56b through the oxidizing gas-passing groove 65. The air sent to the oxidizing gas outlet 56b is discharged from the oxidizing gas outlet 120b of the end plate 24. With this mechanism, electric power is generated in the fuel cell stack 12, so that electric power is supplied to an external load (not shown) such as a motor, etc. connected between terminals for receiving electric power.

Figure 1:
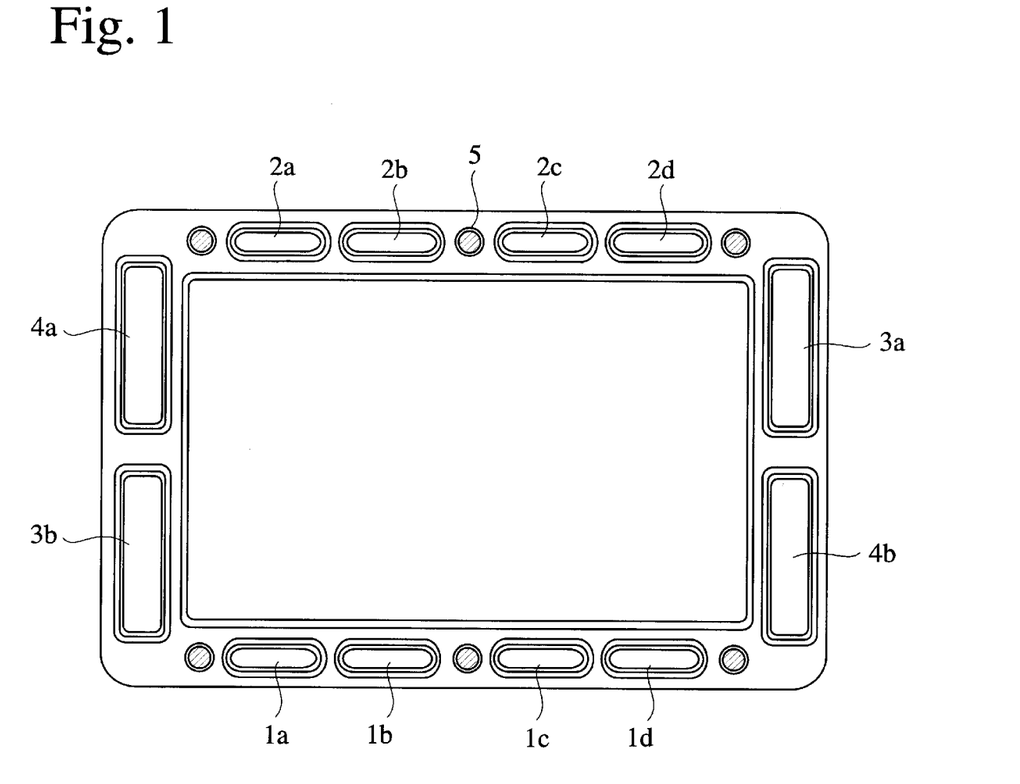
FIG. 1 is a plan view showing a separator assembled in a fuel cell stack according to one embodiment of the present invention.

The fuel cell stack is integrally fixed together in a lamination direction (direction indicated by the arrow A) by a method as described below. FIG. 1 is a plan view showing a separator constituting the fuel cell stack according to the first embodiment of the present invention, and FIG. 2 is a partially enlarged cross-sectional view showing a portion of the separator including a hole into which an insulator-coated rod is inserted.

In FIG. 1, a substantially rectangular separator comprises cooling medium inlet openings 1a–1d and cooling medium outlet openings 2a–2d in edge portions on lower and upper long sides, respectively. The separator also comprises an oxidizing gas inlet opening 3a, an oxidizing gas outlet opening 3b, a fuel gas inlet opening 4a, and a fuel gas outlet opening 4b in edge portions on the short sides. The separator further comprises three holes 5 each receiving an insulator-coated rod 6 in each edge portion on lower and upper long sides.

Figure 2:
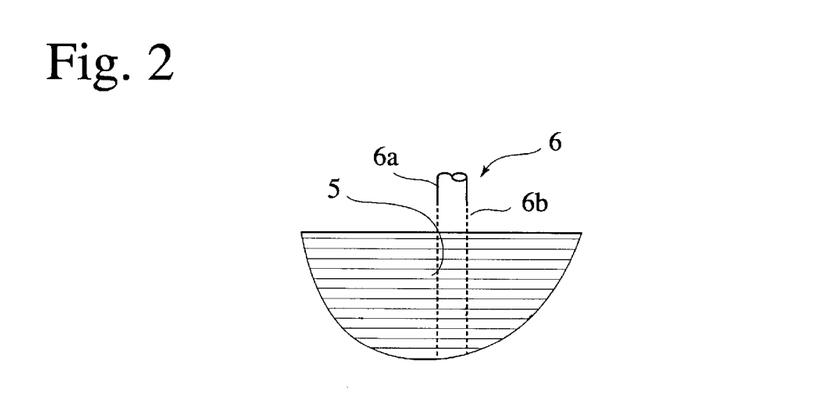
FIG. 2 is a partially enlarged cross-sectional view showing an insulator-coated rod penetrating into a hole of the separator of FIG. 1.

In this embodiment as shown in FIG. 2, the insulator-coated rod 6 penetrating into each hole 5 comprises a rod 6a and an insulator 6b surrounding an outer surface of the rod 6a, the surface of the insulator 6b being substantially in contact with the inner surface of the hole 5. The term "substantially in contact with" used herein means that a surface of the insulator 6b is at least partially in contact with an inner surface of the hole 5, such that there would occur neither sliding nor opening between the constituent members of the fuel cell stack 12 such as fuel cell units and separators, even if the fuel cell stack 12 were subjected to vibration, shock, etc. for a long period of time. Accordingly, the surface of the insulator 6b need not be in full contact with the inner surface of the hole 5 without gaps in entire periphery, and as long as horizontal sliding can be prevented in the constituent members of the laminate 9 by contact of a plurality of insulator-coated rods 6 with a plurality of holes 5, surfaces of the insulators 6b may be in partial contact with inner surfaces of the holes 5. For instance, a surface of the insulator 6b of each insulator-coated rod 6 may be in contact with only an inner or outer side of the inner surface of each hole 5.

Figure 10:
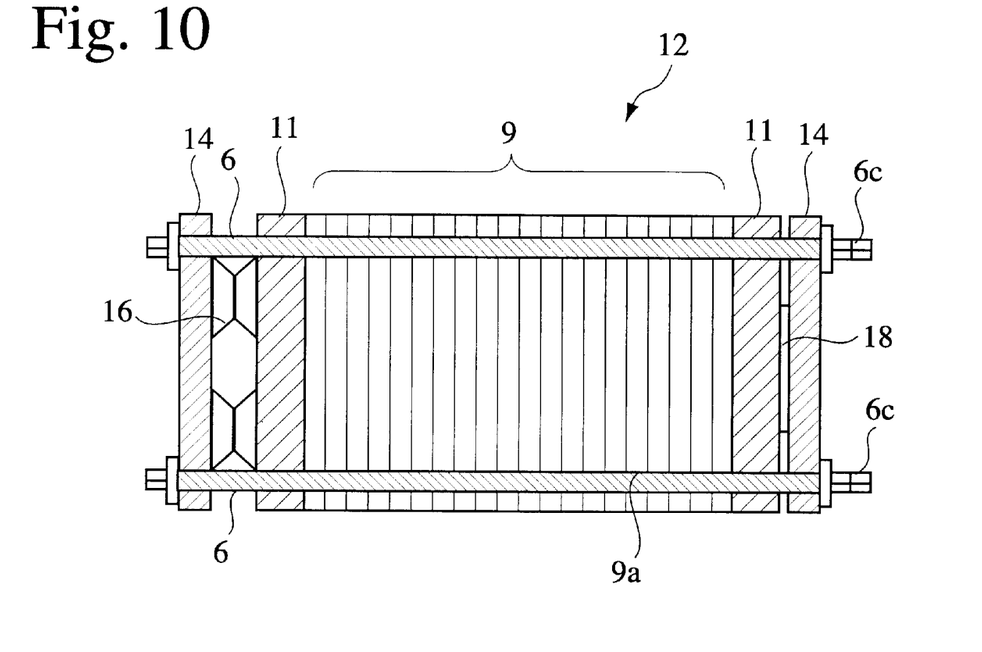
FIG. 10 is a vertical cross-sectional view showing a fuel cell stack according to one embodiment of the present invention.

FIG. 10 shows a fuel cell stack 12 comprising a plurality of fuel cell units and separators respectively having the same hole arrangement as in FIG. 1, and fixing members 11, 11 disposed on both ends of the laminate 9, which are fastened together with insulator-coated rods 6. Backup plates 14, 14 disposed outside the fixing members 11, 11 have a plurality of holes, into which the insulator-coated rods 6 are penetrating, with nuts 6c, 6c screwed to the threaded end portions of the rods 6. Incidentally, 16 denotes a Belleville spring, and 18 denotes a flat washer. Because the holes 9a of the laminate 9 are in contact with the insulator-coated rods 6, there would be neither slide nor open gaps between the constituent members of the laminate even if vibration and shock were given for a long period of time in a state where the fuel cell stack 12 is horizontally fixed.

Figure 3:
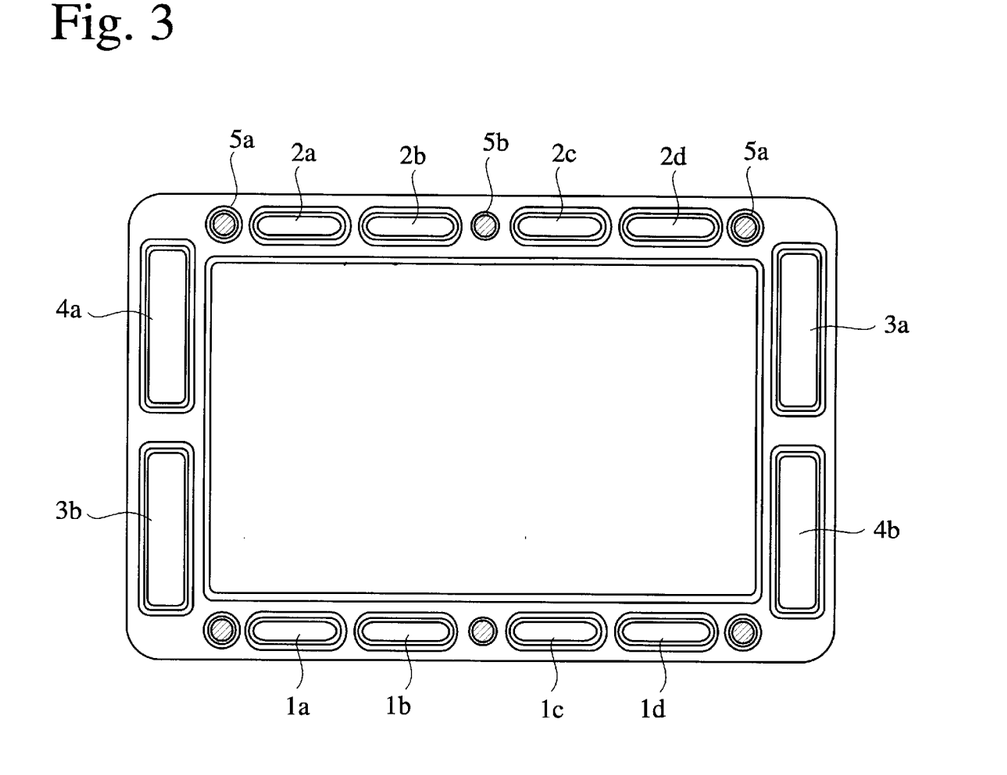
FIG. 3 is a plan view showing a separator assembled in a fuel cell stack according to another embodiment of the present invention.
Figure 4:
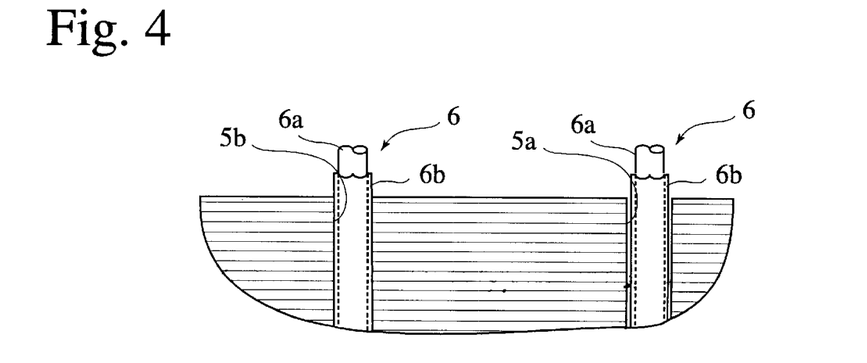
FIG. 4 is a partially enlarged cross-sectional view showing insulator-coated rods penetrating into holes of the separator of FIG. 3.

FIG. 3 shows a separator constituting a fuel cell stack according to another embodiment of the present invention. Because this separator differs from that shown in FIG. 1 only in the size of holes, explanation will be made here only on the holes. In this embodiment, holes 5a, 5a in edge portions on both long sides have a slightly large inner diameter than that of the center hole 5b. Accordingly, as shown in FIG. 4, the hole 5a provides a gap between its inner surface and a surface of an insulator 6b of the insulator-coated rod 6, while the hole 5b has an inner surface in full contact with a surface of an insulator 6b of the insulator-coated rod 6. Thus, with one small-diameter hole 5b in an edge portion on each long side, it is possible to prevent the constituent members of the fuel cell stack 12 from sliding and opening.

Figure 5:
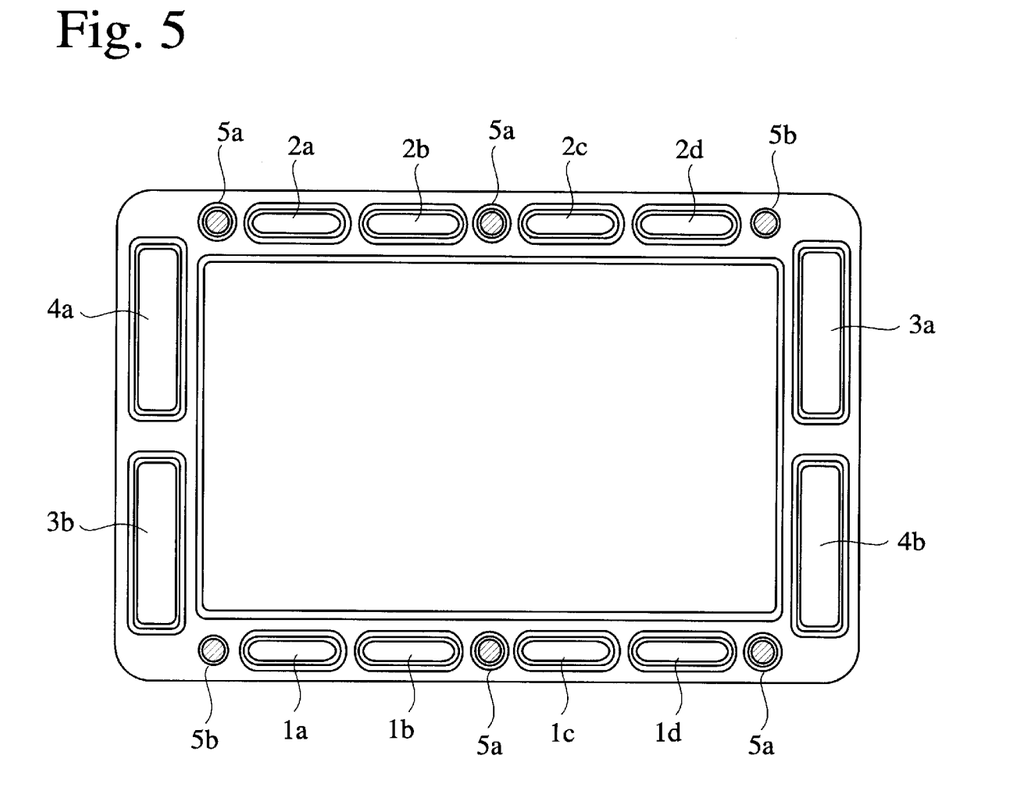
FIG. 5 is a plan view showing a separator assembled in a fuel cell stack according to a further embodiment of the present invention.
Figure 6:
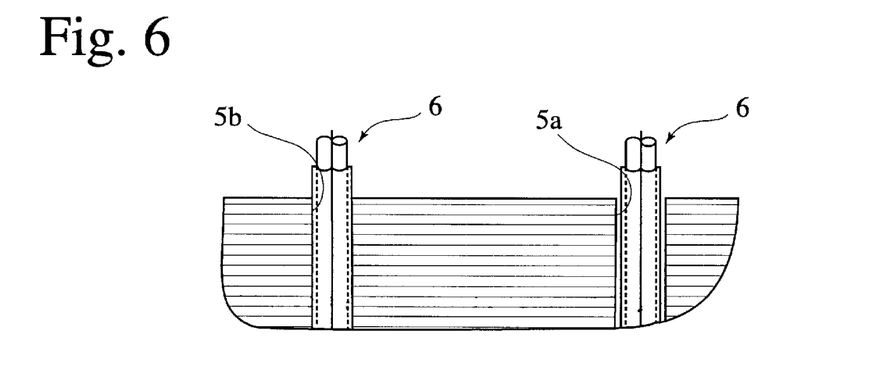
FIG. 6 is a partially enlarged cross-sectional view showing insulator-coated rods penetrating into holes of the separator of FIG. 5.

FIGS. 5 and 6 show a separator constituting the fuel cell stack according to a still further embodiment of the present invention. This separator differs from that shown in FIG. 3 only in the arrangement of holes 5a, 5b. In this embodiment, small-diameter holes 5b are disposed at diagonal positions. Such arrangement of holes 5b can prevent the constituent members of the fuel cell stack 12 from sliding or opening from each other.

Figure 7:
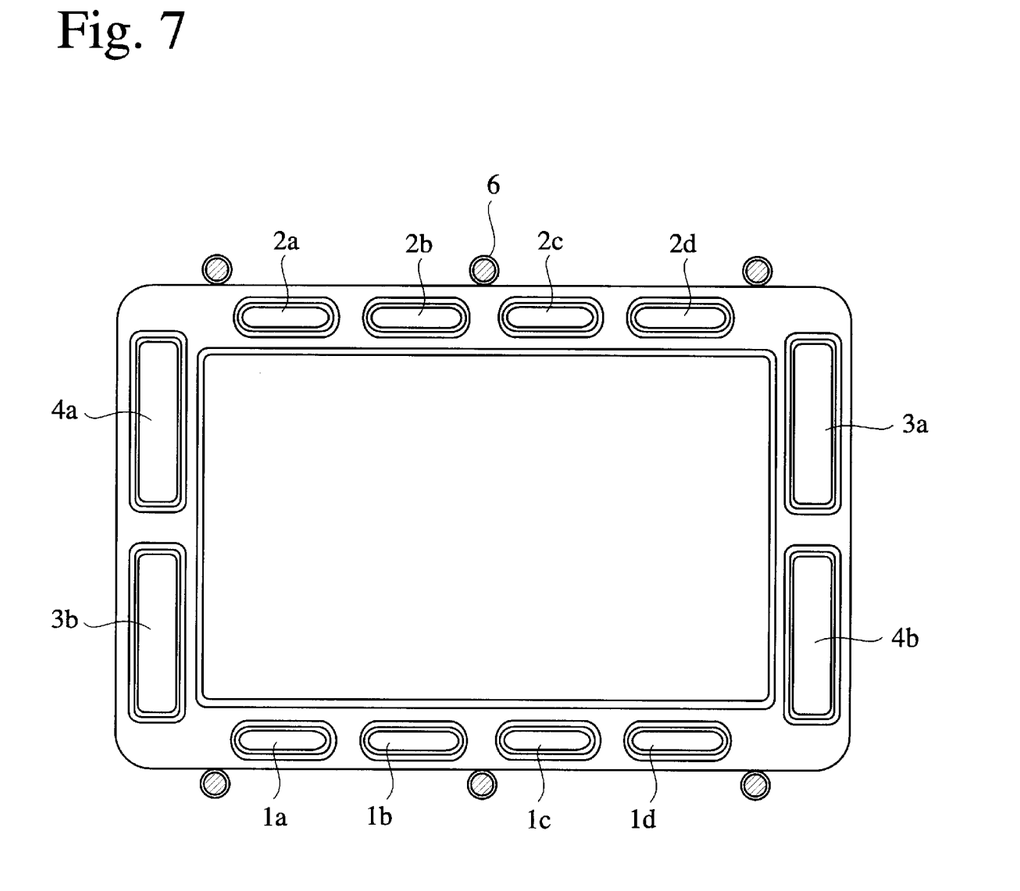
FIG. 7 is a plan view showing a separator assembled in a fuel cell stack according to a still further embodiment of the present invention.

FIG. 7 shows a separator constituting a fuel cell stack according to a still further embodiment the present invention. Without holes in this separator, insulator-coated rods 6 are in contact with an outer periphery of the separator. With such arrangement of the insulator-coated rods 6, the constituent members of the fuel cell stack 12 can be prevented from sliding and opening.

Figure 8:
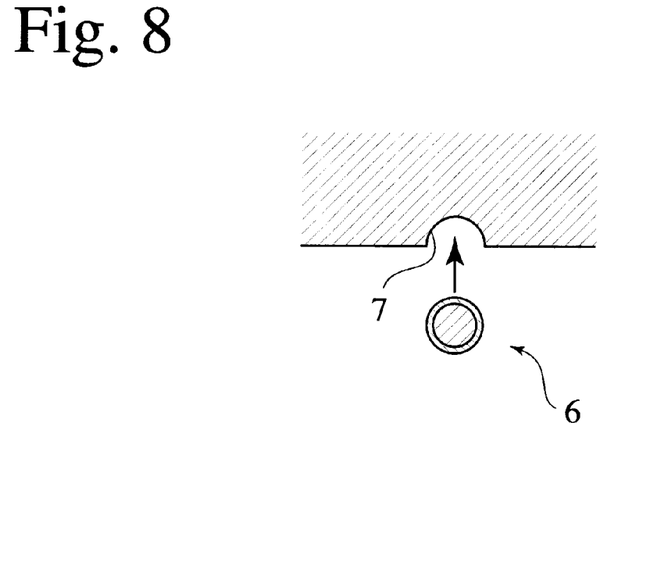
FIG. 8 is a partially enlarged cross-sectional view showing a separator having grooves, with which insulator-coated rods are in contact.

FIG. 8 shows a portion of the separator including a groove, which constitutes a fuel cell stack according to a still further embodiment of the present invention. The insulator-coated rod 6 is in contact with an inner surface of the groove 7 of the separator. With such contact of the insulator-coated rods 6 with the grooves 7, the constituent members of the fuel cell stack 12 can be prevented from sliding and opening.

Figure 9:
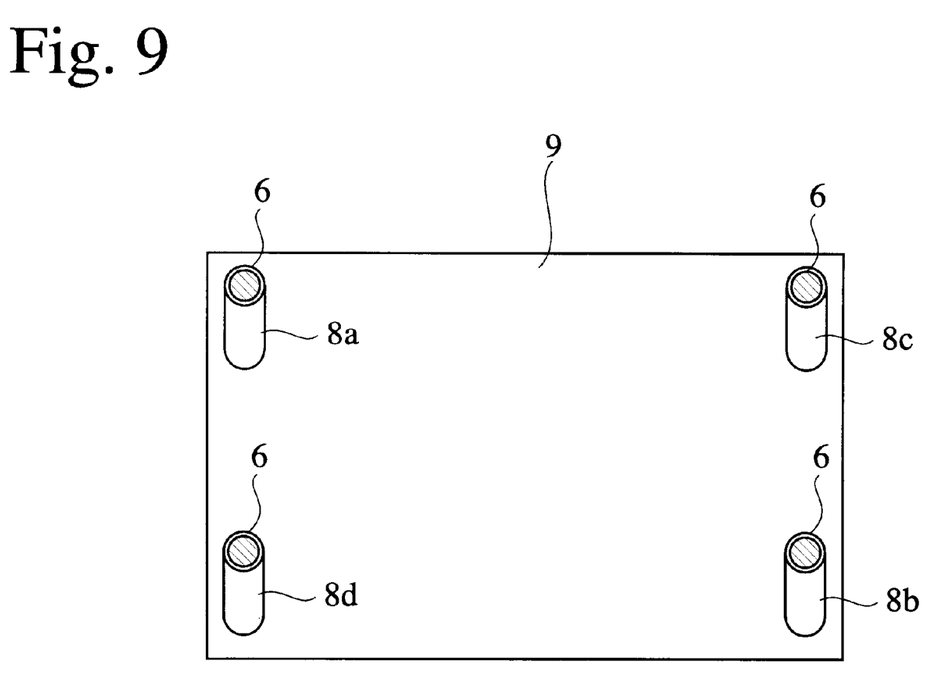
FIG. 9 is a plan view showing a separator assembled in a fuel cell stack according to a still further embodiment of the present invention, the separator having holes into which insulator-coated rods penetrate.

FIG. 9 shows an embodiment in which insulator-coated rods 6 are penetrating into a fuel gas inlet opening 8a, a fuel gas outlet opening 8b, an oxidizing gas inlet opening 8c and an oxidizing gas outlet opening 8d. Because the insulator-coated rods 6 are in contact with one side of each opening 8a–8d, the constituent members of the fuel cell stack 12 can be prevented from sliding and opening.

Figure 11:
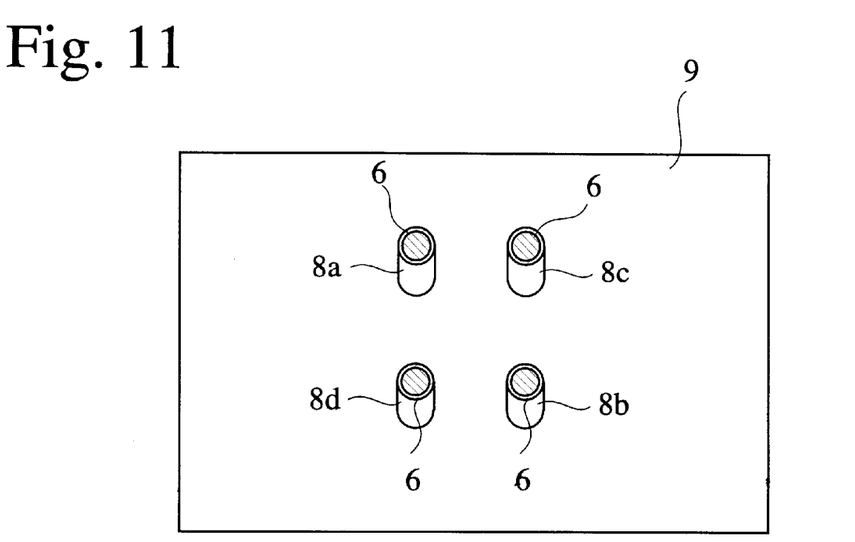
FIG. 11 is a plan view showing a separator assembled in a fuel cell stack according to a still further embodiment of the present invention, the separator having holes into which insulator-coated rods penetrate.

FIG. 11 shows an embodiment in which a fuel gas inlet opening 8a, a fuel gas outlet opening 8b, an oxidizing gas inlet opening 8c and an oxidizing gas outlet opening 8d are positioned substantially in a center portion of the fuel cell stack (laminate 9 in the figure), insulator-coated rods 6 penetrating into them. Because the insulator-coated rods 6 are in contact with one side of each opening 8a–8d, the constituent members of the fuel cell stack 12 can be prevented from sliding and opening.

Though the preferred embodiments of the present invention have been explained referring to the drawings attached hereto, it should be noted that the present invention can be altered and modified within the scope defined by the claims attached hereto. For instance, an insulator can be applied to the holes or the outer surface of the laminate without insulator on the rod. Also, both of the rods and the laminate can be provided with insulators to have higher reliability in insulation. Accordingly, what is necessary in the present invention is that the rod is in contact with the hole or outer surface of the laminate via an insulator, which is provided on at least one of them.

As described above in detail, because the fuel cell units and the separators constituting the fuel cell stack of the present invention are provided with a plurality of holes in their peripheral portions, each hole having such an inner diameter that a surface of a rod penetrating thereinto is at least partially in contact with an inner surface of the hole, sliding and opening can be prevented completely between the fuel cell units and the separators, even if the fuel cell stack is subjected to vibration, shock, etc. for a long period of time. The fuel cell stack of the present invention having such a structure is free from disadvantages inherent in horizontally disposed fuel cell stacks. Accordingly, the fuel cell stack can be designed to have extremely small height, so that it can easily be mounted in a low-height space such as a space under a floor of an automobile body, etc.

What is claimed is:

1. A fuel cell stack comprising a horizontal laminate of a plurality of fuel cell units and separators, each fuel cell unit being constituted by an electrolytic membrane sandwiched by an anode and a cathode, and fixing members disposed horizontally on both sides of said laminate, said laminate and said fixing members having a plurality of holes penetrating therethrough in a lamination direction, each hole receiving a rod for fastening said laminate in a lamination direction, at least one of an inner surface of said hole and an outer surface of said rod being provided with an insulator, and the surface of said rod being at least partially in contact with the inner surface of each hole of said laminate via said insulator.

2. The fuel cell stack according to claim 1, wherein said rod is coated with an insulator, an insulator surface of the insulator-coated rod being substantially in contact with an inner surface of each hole of said laminate.

3. The fuel cell stack according to claim 2, wherein the insulator surfaces of all insulator-coated rods are substantially in contact with the inner surfaces of said holes of said laminate.

4. A fuel cell stack comprising a horizontal laminate of a plurality of fuel cell units and separators, each fuel cell unit being constituted by an electrolytic membrane sandwiched by an anode and a cathode, and fixing members disposed horizontally on both sides of said laminate, said laminate being fastened in a lamination direction by rods disposed outside said laminate and fixed to said fixing members, at least one of an outer surface of said laminate and an outer surface of said rod being provided with an insulator, and the surface of said rod being at least partially in contact with the outer surface of said laminate via said insulator.

5. The fuel cell stack according to claim 4, wherein said rod is coated with an insulator, an insulator surface of the insulator-coated rod being substantially in contact with the outer surface of said laminate.

6. The fuel cell stack according to claim 5, wherein said laminate comprises a plurality of horizontal grooves on the surface, said insulator-coated rods being substantially in contact with inner surfaces of said horizontal grooves.

7. A fuel cell stack comprising a horizontal laminate of a plurality of fuel cell units and separators, each fuel cell unit being constituted by an electrolytic membrane sandwiched by an anode and a cathode, and fixing members disposed horizontally on both sides of said laminate, a plurality of holes for passing a reaction gas penetrating through said laminate and said fixing members in a lamination direction, each hole receiving a rod for fastening said laminate in a lamination direction, at least one of an inner surface of said hole and an outer surface of said rod being provided with an insulator, and the surface of said rod being at least partially in contact with the inner surface of each hole of said laminate via said insulator.

8. The fuel cell stack according to claim 7, wherein said rod is coated with an insulator, an insulator surface of the insulator-coated rod being substantially in contact with an inner surface of each penetrating hole.

* * * * *